United States Patent
Xu et al.

(10) Patent No.: US 12,347,615 B1
(45) Date of Patent: Jul. 1, 2025

(54) SIDE FIREARM MAGNET MOUNT AND METHOD OF SECURELY HOLDING FIREARM AND PREVENTING ACCIDENTAL DISCHARGE

(71) Applicants: Ye Xu, Sugar Land, TX (US); Mingshun Xiong, Wuhan (CN)

(72) Inventors: Ye Xu, Sugar Land, TX (US); Mingshun Xiong, Wuhan (CN)

( * ) Notice: Subject to any disclaimer, the term of this patent is extended or adjusted under 35 U.S.C. 154(b) by 0 days.

(21) Appl. No.: 18/905,130

(22) Filed: Oct. 2, 2024

(51) Int. Cl.
| | |
|---|---|
| *H01F 7/02* | (2006.01) |
| *A47B 81/00* | (2006.01) |
| *F16M 13/02* | (2006.01) |
| *B60R 7/14* | (2006.01) |

(52) U.S. Cl.
CPC ......... *H01F 7/0252* (2013.01); *A47B 81/005* (2013.01); *F16M 13/02* (2013.01); *B60R 7/14* (2013.01)

(58) Field of Classification Search
CPC ........ B60R 7/14; F16M 13/02; A47B 81/005; H01F 7/0252
USPC .............................................................. 42/99
See application file for complete search history.

(56) References Cited

U.S. PATENT DOCUMENTS

| | | | | |
|---|---|---|---|---|
| 9,746,299 | B1 * | 8/2017 | Davis | A45F 5/022 |
| 9,777,988 | B2 * | 10/2017 | Karcher | F41C 33/041 |
| 9,995,544 | B1 * | 6/2018 | Akimov | F41A 3/72 |
| 10,141,092 | B2 * | 11/2018 | Bennett | F41C 33/041 |
| D956,167 | S * | 6/2022 | Xu | D22/108 |
| D963,781 | S * | 9/2022 | Ye | D22/110 |
| D984,576 | S * | 4/2023 | Liang | D6/552 |
| 11,747,109 | B1 * | 9/2023 | Myers | F41C 33/048 224/183 |
| 11,933,581 | B1 * | 3/2024 | Levette | F41C 3/00 |
| 11,971,236 | B1 * | 4/2024 | James | F41A 23/00 |
| 2012/0255979 | A1 * | 10/2012 | Sitz | F41C 33/0245 42/90 |
| 2014/0224847 | A1 * | 8/2014 | Miller | F41C 33/0263 224/183 |
| 2015/0014499 | A1 * | 1/2015 | Mantua | F16M 13/00 248/314 |
| 2016/0109208 | A1 * | 4/2016 | Bottrell | F41A 9/24 42/90 |
| 2016/0209165 | A1 * | 7/2016 | Karcher | F41C 33/0254 |
| 2020/0049444 | A1 * | 2/2020 | Cerda | B60R 7/14 |
| 2020/0196741 | A1 * | 6/2020 | Salvitti | F41C 33/0236 |

(Continued)

OTHER PUBLICATIONS

NPL: https://thestingertools.com/products/stinger-magnetic-gun-mount-with-safety-trigger-guard-protection?srsltid=AfmBOopdij8qveryYtTOeOluq9nSCLTGTyEQQKHvpEpioOk4bx2ZR5oa Mar. 2019.*

*Primary Examiner* — John Cooper
(74) *Attorney, Agent, or Firm* — George Guosheng Wang; Upstream Research and Patent LLC

(57) ABSTRACT

The present invention provides a magnet mount for securely holding a firearm. The magnet mount includes a side mounting plate, one or more magnets are affixed to the side mounting plate, and a firearm holder. The firearm includes (a) a firearm seat, (b) a connector extending upwardly from the firearm seat and connecting to the side mounting plate, and (c) a trigger shield extending upwardly from the firearm seat. The trigger shield is configured for blocking at least 50% of a trigger accessing area of the firearm to prevent accidental discharge. Also provided is a method of securely holding a firearm using the magnet mount.

17 Claims, 17 Drawing Sheets

(56) References Cited

U.S. PATENT DOCUMENTS

2022/0299286 A1\* 9/2022 Featherston, Jr. ...... F41A 23/18
2022/0361652 A1\* 11/2022 Stutz ..................... A44B 99/00

\* cited by examiner (i) providing magnet mount with side mounting plate, firearm seat and trigger shield (ii) placing firearm on the firearm seat and side by side with side mounting plate (iii) blocking at least 50% of trigger accessing area of firearm with trigger shield

SIDE FIREARM MAGNET MOUNT AND METHOD OF SECURELY HOLDING FIREARM AND PREVENTING ACCIDENTAL DISCHARGE

FIELD OF THE INVENTION

The present invention generally relates to a side firearm magnet mount and a method of using the magnet mount to securely hold a firearm and prevent accidental discharge. Although the invention will be illustrated, explained and exemplified by semi-automatic pistol, it should be appreciated that the present invention can also be applied to other firearms, for example, other handguns such as revolver, derringer, and machine pistol; long-barreled guns such as carbine, rifle, shotgun, submachine gun, submachine gun, and machine gun; and the like.

BACKGROUND OF THE INVENTION

Most of the population in the U.S. currently lives with a gun in their house. Just one-third of adults in the U.S. do not own a gun and cannot see themselves owning one in the future. The population of gun owners has been increasing rapidly in recent years. For example, the COVID-19 pandemic, compounded by the George Floyd protests and riots, mixed with threats of "Civil War 2" leading up to and following a hotly contested presidential election, created an unprecedented gun-buying spree in 2020. As of 2024, there are estimated to be over 466 million firearms in the United States. This includes guns owned by civilians, law enforcement, and other entities. The vast majority, over 98%, are in civilian hands, which equates to about 120 firearms per 100 citizens.

Therefore, accidental discharges of firearms become a big concern in the United States. An accidental discharge of a firearm, also known as an unintentional discharge of a firearm, is defined as discharging the firearm at a time not intended by the firearm user. An accidental discharge can occur in any place, including homes and public places. In cases of accidental discharge, individuals may be injured and/or property may be damaged. Accidental discharge of a firearm penalty may include a misdemeanor or a felony conviction, depending on the circumstances, including the degree of negligence exercised by the firearm user.

While accidental discharges may be caused by negligent handling and mechanical failures, they can also be caused by improper storage of a loaded firearm in an unsafe manner and firearm trigger that is too sensitive or has been modified improperly. For example, an individual may attempt to grab a stored firearm but accidentally squeezes the trigger with sufficient force to cause a discharge. A light trigger pull weight (i.e. amount of force required to pull a trigger) can improve accuracy by reducing the amount of force needed to fire the gun. This minimizes the movement of the firearm when the trigger is pulled, allowing for more precise shot placement. However, a light trigger can also increase the risk of accidental discharges, especially if the firearm is stored and handled carelessly. A heavier trigger pull is not a perfect solution to solve the problem associated with trigger sensitivity, because it can negatively impact accuracy; and an increased force is needed to pull the trigger, causing the shooter to jerk the gun and pulling shots off target.

Therefore, to prevent accidental discharges (particularly for those with light trigger pull weight), it's crucial to use appropriate storage solutions such as gun mounts, gun safes or lockboxes, and keep gun user's finger off the trigger until he/she is ready to shoot. Advantageously, the firearm mount of the present invention can exhibit some technical merits that can reduce the likelihood of accidental discharges due to unintentional trigger contact.

SUMMARY OF THE INVENTION

One aspect of the present invention provides a magnet mount for securely holding a firearm. The magnet mount includes a side mounting plate configured for placing next to one side (left/right side) of the firearm. The side mounting plate does not block the line connecting the front sight and the rear sight of the firearm. One or more magnets are affixed to the side mounting plate, and these magnets are configured for providing a holding power to support at least a portion of the weight of the firearm. The magnet mount includes a firearm holder including (a) a firearm seat for the firearm to be placed thereon, (b) a connector extending upwardly from the firearm seat along said one side of the firearm and connecting to the side mounting plate, and (c) a trigger shield extending upwardly from the firearm seat along another side (right/left side) of the firearm. The trigger shield is configured for blocking at least 50% of a trigger accessing area of the firearm, to prevent a finger from accessing to, and touching, the trigger from said another side of the firearm and causing accidental discharge. The term "trigger accessing area" is defined as the area that is encircled by the trigger guard and the frame of the firearm.

Another aspect of the invention provides a method of securely holding a firearm. Step (i) of the method is providing a magnet mount comprising a side mounting plate, one or more magnets affixed to the side mounting plate, and a firearm holder including (a) a firearm seat, (b) a connector extending upwardly from the firearm seat along one side (left/right side) of the firearm and connecting to the side mounting plate, and (c) a trigger shield extending upwardly from the firearm seat along another side (right/left side) of the firearm. Step (ii) of the method is placing the firearm on the firearm seat and next to said one side (left/right side) of the magnet mount (which does not block a line connecting the front sight and the rear sight of the firearm). The magnets provide a holding power to support at least a portion of the weight of the firearm. Step (iii) of the method is blocking at least 50% of a trigger accessing area of the firearm with the trigger shield, to prevent a finger from accessing to and touching the trigger from said another side of the firearm and causing accidental discharge. The term "trigger accessing area" is defined as the area that is encircled by the trigger guard and the frame of the firearm.

The above features and advantages and other features and advantages of the present invention are readily apparent from the following detailed description of the best modes for carrying out the invention when taken in connection with the accompanying drawings.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements. All the figures are schematic and generally only show parts which are necessary in order to elucidate the invention. For simplicity and clarity of illustration, elements shown in the figures and discussed below have not necessarily been drawn to scale. Well-known structures and devices are shown in simplified form, omit- FIG. 1 schematically shows a magnet mount designed for securely holding a firearm in accordance with an exemplary embodiment of the present invention.

DETAILED DESCRIPTION OF THE PREFERRED EMBODIMENT

In the following description, for the purposes of explanation, numerous specific details are set forth in order to provide a thorough understanding of the present invention. It is apparent, however, to one skilled in the art that the present invention may be practiced without these specific details or with an equivalent arrangement.

Where a numerical range is disclosed herein, unless otherwise specified, such range is continuous, inclusive of both the minimum and maximum values of the range as well as every value between such minimum and maximum values. Still further, where a range refers to integers, only the integers from the minimum value to and including the maximum value of such range are included. In addition, where multiple ranges are provided to describe a feature or characteristic, such ranges can be combined.

It is also to be understood that the terminology used herein is for the purpose of describing particular embodiments only, and is not intended to limit the scope of the invention. For example, when an element is referred to as being "on", "connected to", or "coupled to" another element, it can be directly on, connected or coupled to the other element or intervening elements may be present. In contrast, when an element is referred to as being "directly on", "directly connected to", or "directly coupled to" another element, there are no intervening elements present.

Throughout the specification and claims, the following terms take the meanings explicitly associated herein, unless the context clearly dictates otherwise. The phrase "in one embodiment" does not necessarily refer to the same embodiment, although it may. Furthermore, the phrase "in another embodiment" does not necessarily refer to a different embodiment, although it may. Thus, as described below, various embodiments of the invention may be readily combined without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Figure 1:
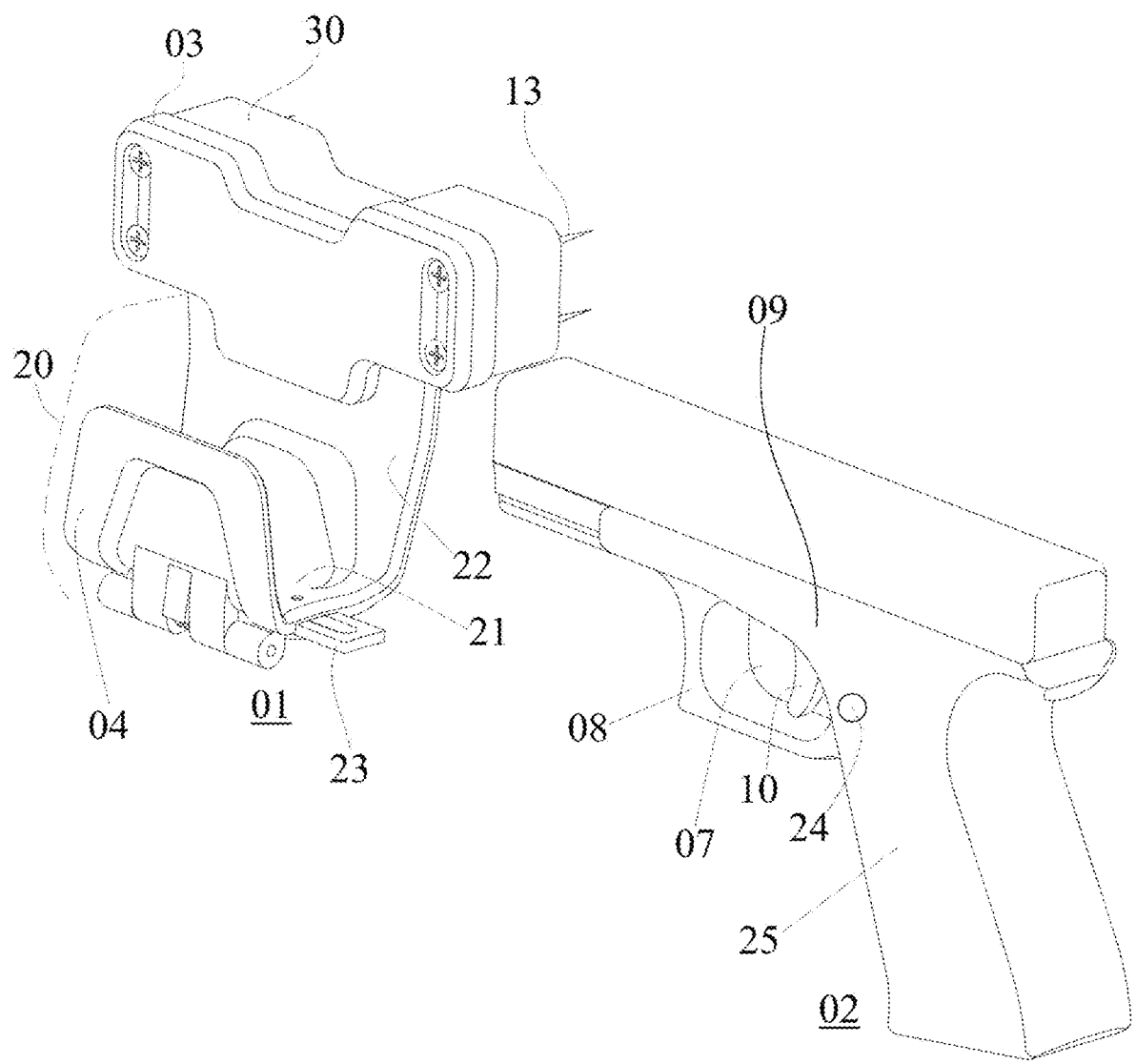
Figure 2:
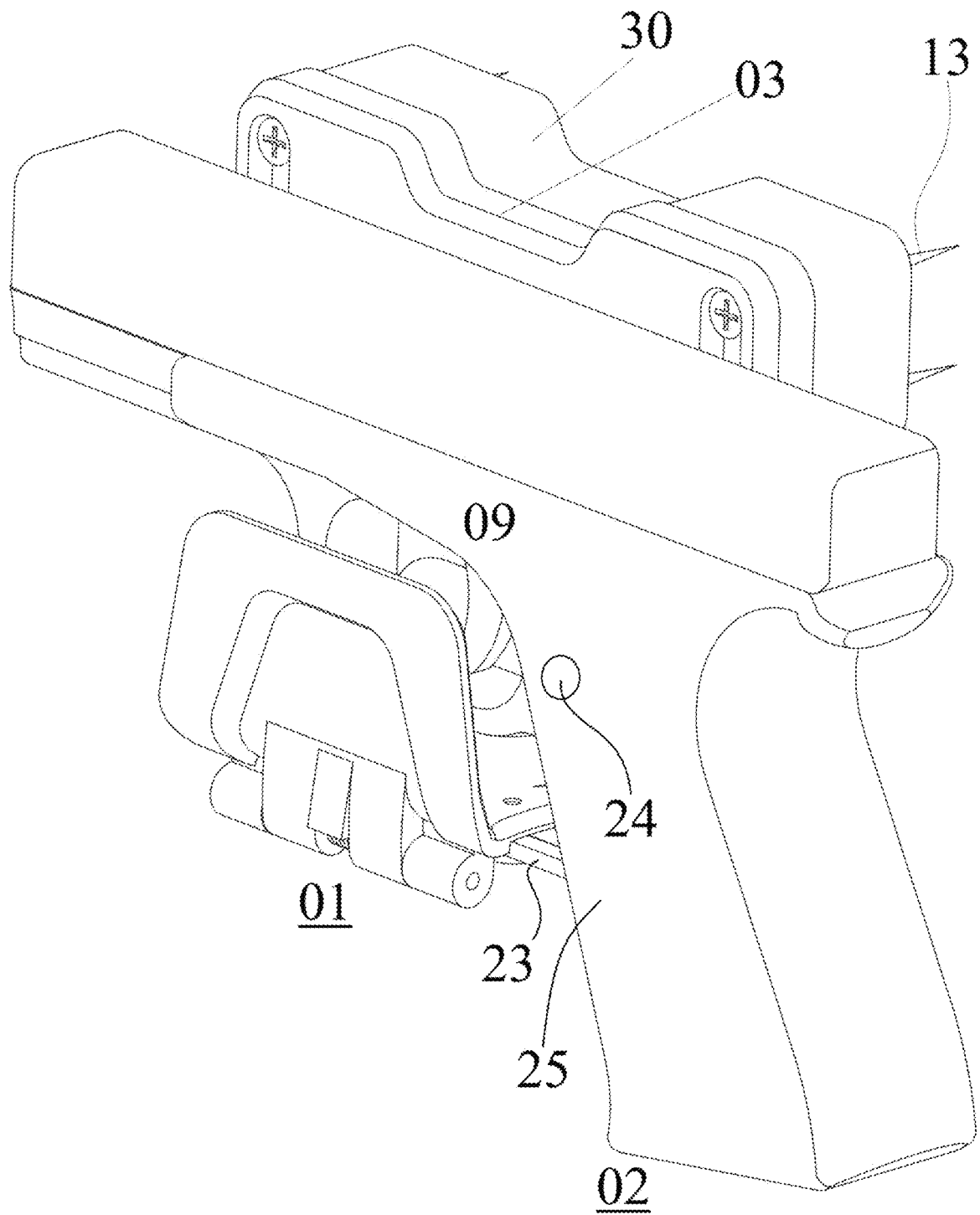
FIG. 2 schematically illustrates a firearm held with magnet mount side by side in accordance with an exemplary embodiment of the present invention.
Figure 3:
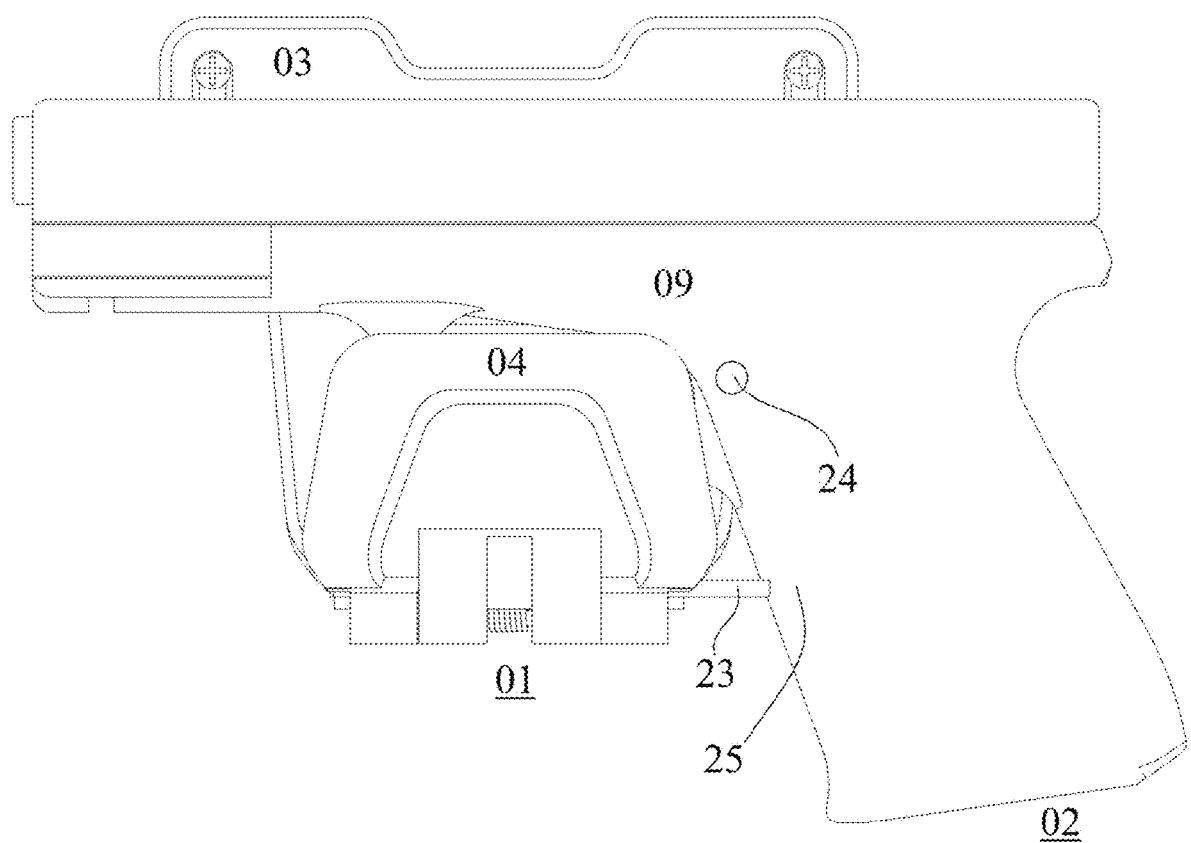
FIG. 3 is another view showing a firearm held with magnet mount side by side in accordance with an exemplary embodiment of the present invention.

Referring to FIGS. 1-3, various embodiments of the present invention provide a magnet mount 01 for securely holding a firearm 02. As shown in FIG. 1, the magnet mount 01 includes a side mounting plate 03 configured for placing next to one side (left/right side) of the firearm 02. The side mounting plate 03 does not block the line connecting the front sight (not shown) and the rear sight (not shown) of the firearm 02 when it is held/stored by the magnet mount 01. The magnet mount 01 further includes a firearm holder 20 with a firearm seat 21 for the firearm 02 to be placed thereon, a connector 22 extending upwardly from the firearm seat 21 along said one side of the firearm 02 and connecting to the side mounting plate 03, and a trigger shield 04 also extending upwardly from the firearm seat 21 along another side (right/left side) of the firearm 02. The trigger shield 04 may be configured for blocking at least 50% of a trigger accessing area 07 of the firearm 02, to prevent a human finger from accessing to, and touching, the trigger 10 from said another side of the firearm 02 and causing accidental discharge. The term "trigger accessing area 07" is defined as the area that is encircled by the trigger guard 08 and the frame 09 of the firearm 02.

Figure 4:
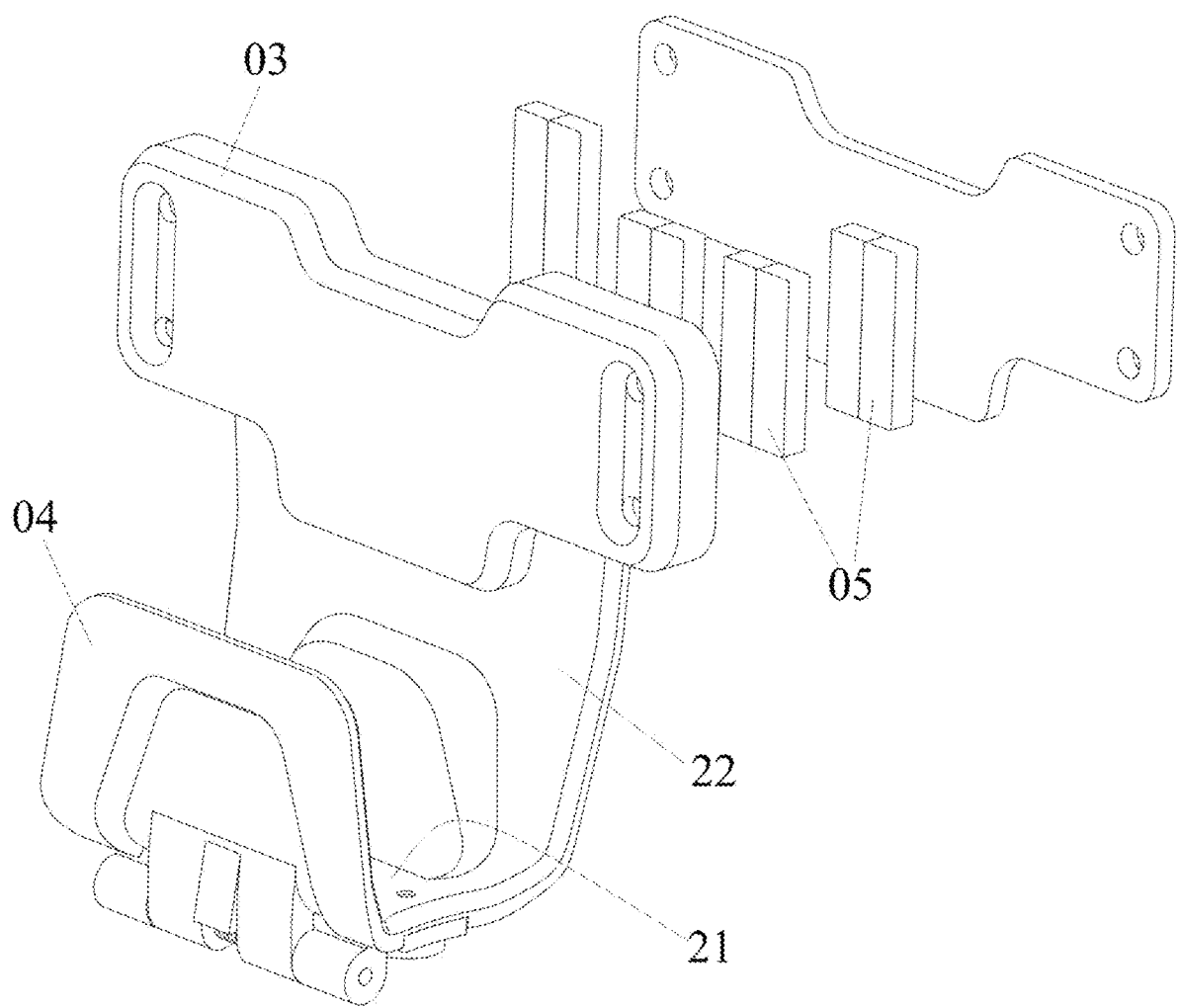
FIG. 4 illustrates a few magnets encased within a side mounting plate of the magnet mount in accordance with an exemplary embodiment of the present invention.

As illustrated in FIG. 4, one or more magnets 05 may be affixed to the side mounting plate 03, and these magnets 05 are configured for providing a holding power to support at least a portion of the weight of the firearm 02. The remaining portion of the weight of the firearm 02 (if any) may be supported by the firearm seat 21.

Figure 5:
FIG. 5 is a flow chart of a method for securely holding a firearm in accordance with an exemplary embodiment of the present invention.
Figure 5:
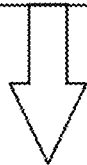

As shown in FIG. 5, other embodiments of the invention provide a method of securely holding a firearm 02. Step (i) of the method is providing a magnet mount 01 comprising a side mounting plate 03, one or more magnets 05 affixed to the side mounting plate 03, and a firearm holder 20 including (a) a firearm seat 21, (b) a connector 22 extending upwardly from the firearm seat 21 along one side (left/right side) of the firearm 02 and connecting to the side mounting plate 03, and (c) a trigger shield 04 extending upwardly from the firearm seat 21 along another side (right/left side) of the firearm 02. Step (ii) of the method is placing the firearm 02 on firearm seat 21 and next to said one side (left/right side) of the magnet mount 01 (which does not block a line connecting the front sight and the rear sight of the firearm 02). Firearm 02 and the side mounting plate 03 are in a side-by-side arrangement. Magnets 05 provide a holding power to support at least a portion of the weight of the firearm 02. Step (iii) of the method is blocking at least 50% of a trigger accessing area 07 of the firearm 02 with the trigger shield 04, to prevent a finger from accessing to and touching the trigger 10 from said another side of the firearm 02 and causing accidental discharge. The term "trigger accessing area 07" is defined as the area that is encircled by the trigger guard 08 and the frame 09 of the firearm 02.

There are no specific limitations on the shape and size of connector 22. However, connector 22 is preferably shaped and sized to block at least 50% of the trigger accessing area 07 of the firearm 02 on the one side of the firearm 02, to prevent a finger from accessing to & touching the trigger 10 from said one side of the firearm 02 and causing accidental discharge.

The trigger shield 04 and the connector 22, independently of each other, may be configured for blocking preferably at least 60%, more preferably at least 70%, even more preferably at least 80%, and most preferably at least 90% such as 100% of the trigger accessing area 07 from their respective side.

Referring to FIGS. 1-3 again, the magnet mount 01 may further comprise an adjustable spacer 23 mounted on the firearm seat 21. Adjustable spacer 23 is designed to protrude out from an edge of the firearm seat 21 and against the firearm grip 25. The size of the adjustable spacer 23 is sufficient to protect magazine release 24 from being touched or contacted by the trigger shield 04 and/or the connector 22 causing an inadvertent release of the magazine (not shown) of firearm 02.

Figure 6:
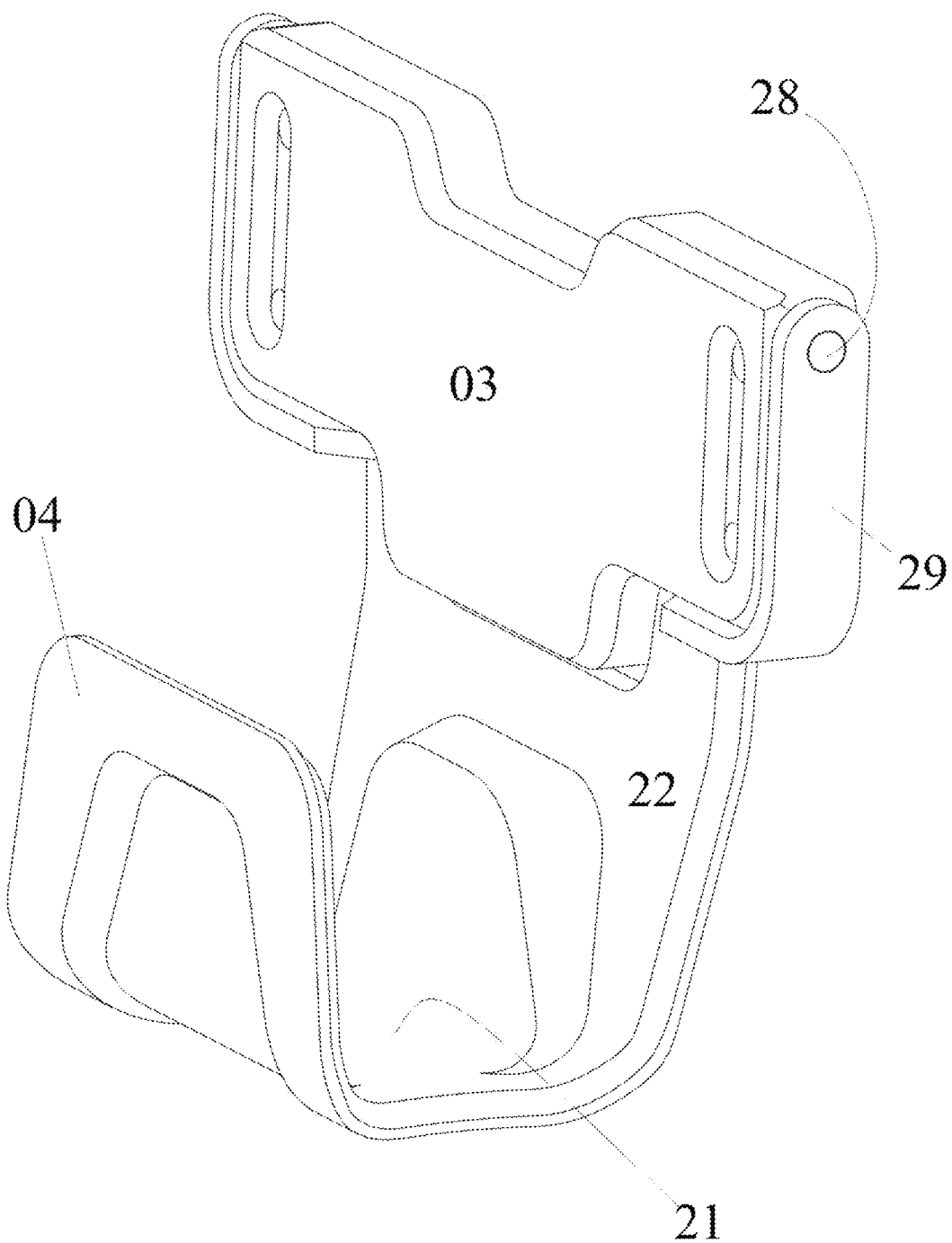
FIG. 6 schematically illustrates a trigger shield and a firearm seat that are manufactured as an integral piece and a connector that is rotatable around a rotation axis through a side mounting plate in accordance with an exemplary embodiment of the present invention.
Figure 7:
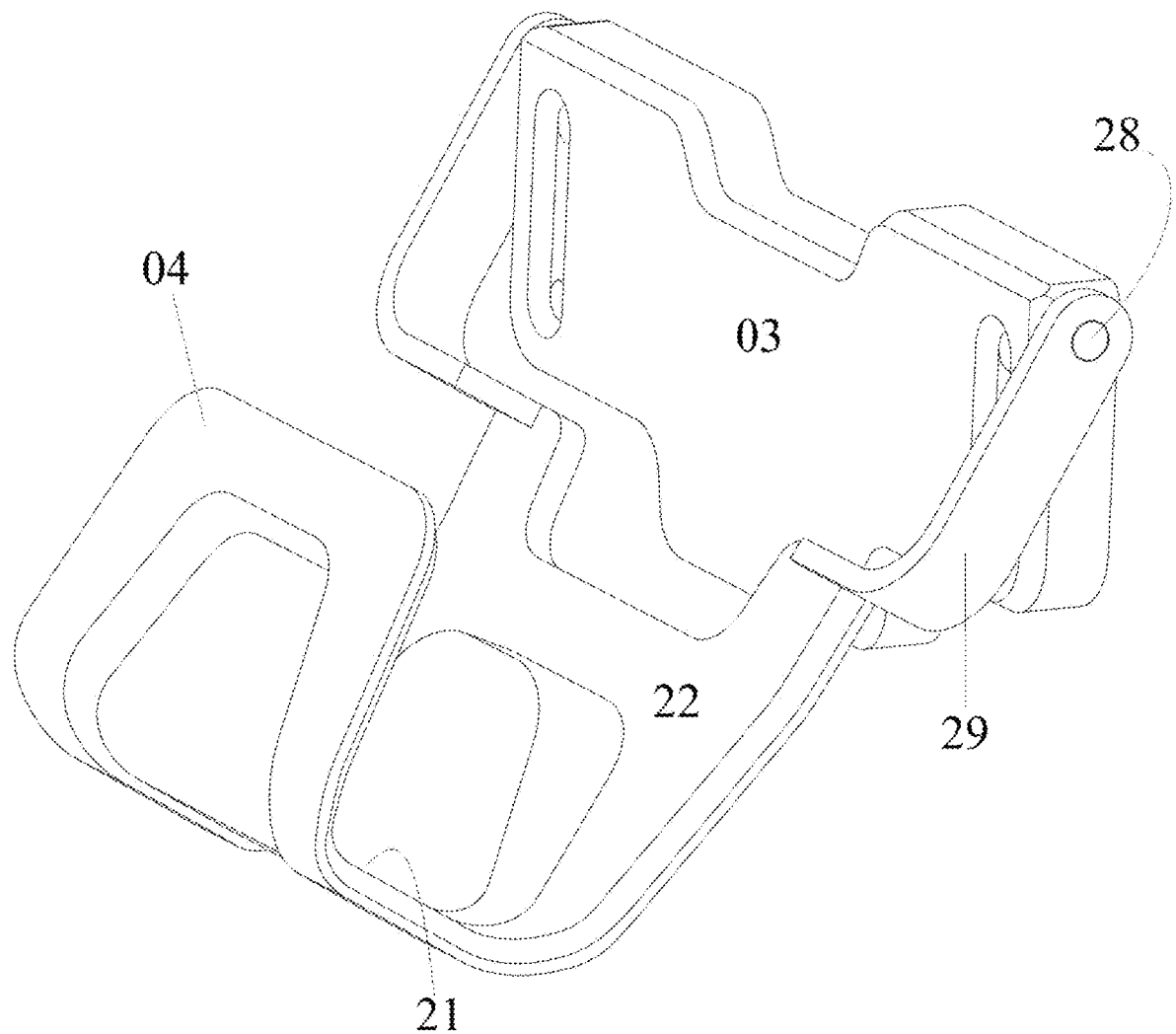
FIG. 7 shows another mode of the trigger shield and the firearm seat that are manufactured as an integral piece and the connector that is rotatable around the rotation axis through the side mounting plate in accordance with an exemplary embodiment of the present invention.

In a variety of embodiments of the invention, the trigger shield 04 and the firearm seat 21 are manufactured as an integral piece that can apply a "squeezing" force to the firearm 02 they are holding to stabilize the firearm 02 and prevent it from sliding off from firearm seat 21, as shown in FIGS. 6-7. In other embodiments, the trigger shield 04, the firearm seat 21, and an elastic member 26 (such as a coil or a spring 26) are built as a clip 27 (such as a spring clip 27) that applies a constant force to the firearm 02 they are holding to stabilize the firearm and prevent it from sliding off.

Figure 8:
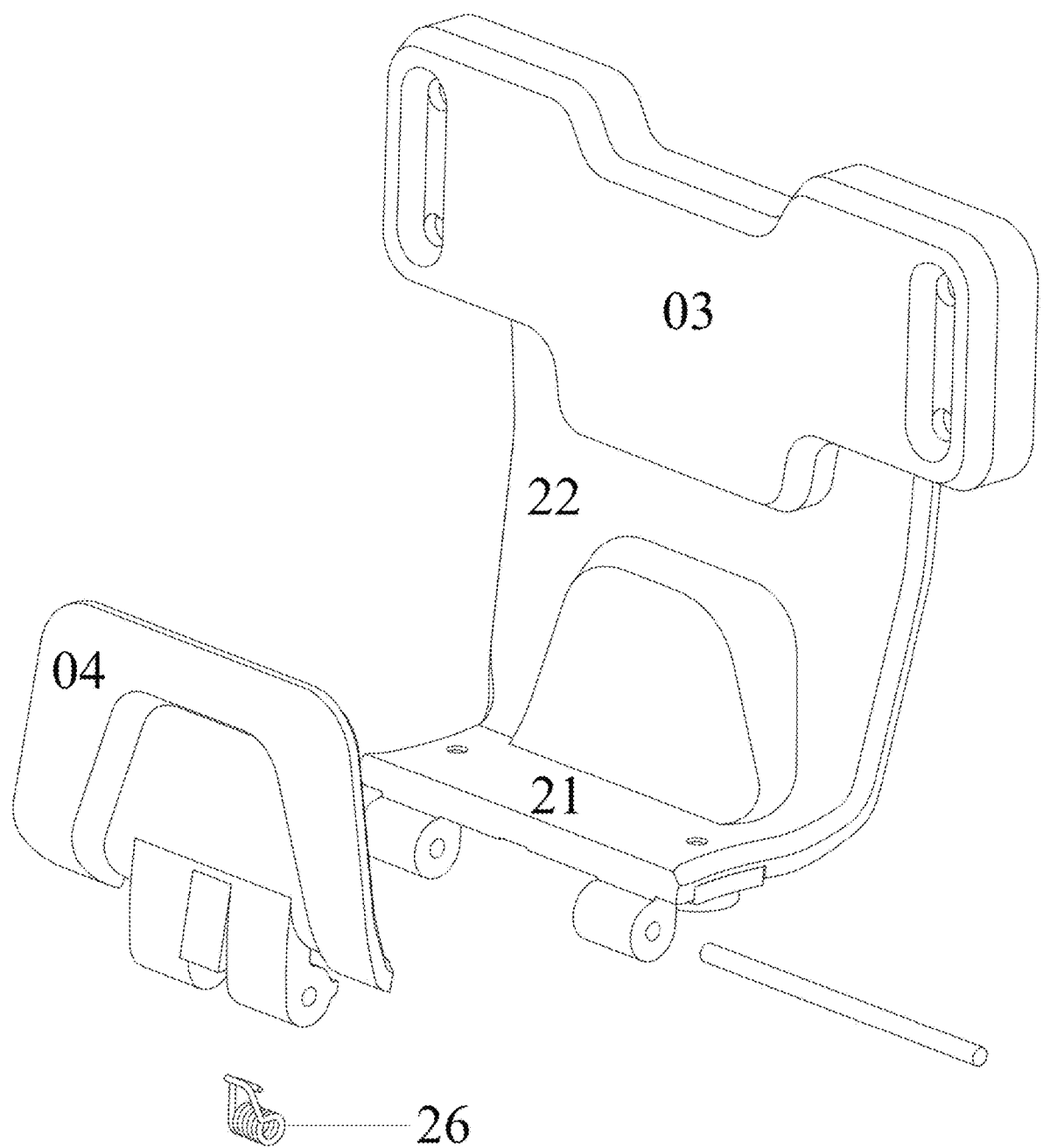
FIG. 8 schematically illustrates a trigger shield and a firearm seat forming a clip structure with a spring in accordance with an exemplary embodiment of the present invention.
Figure 9:
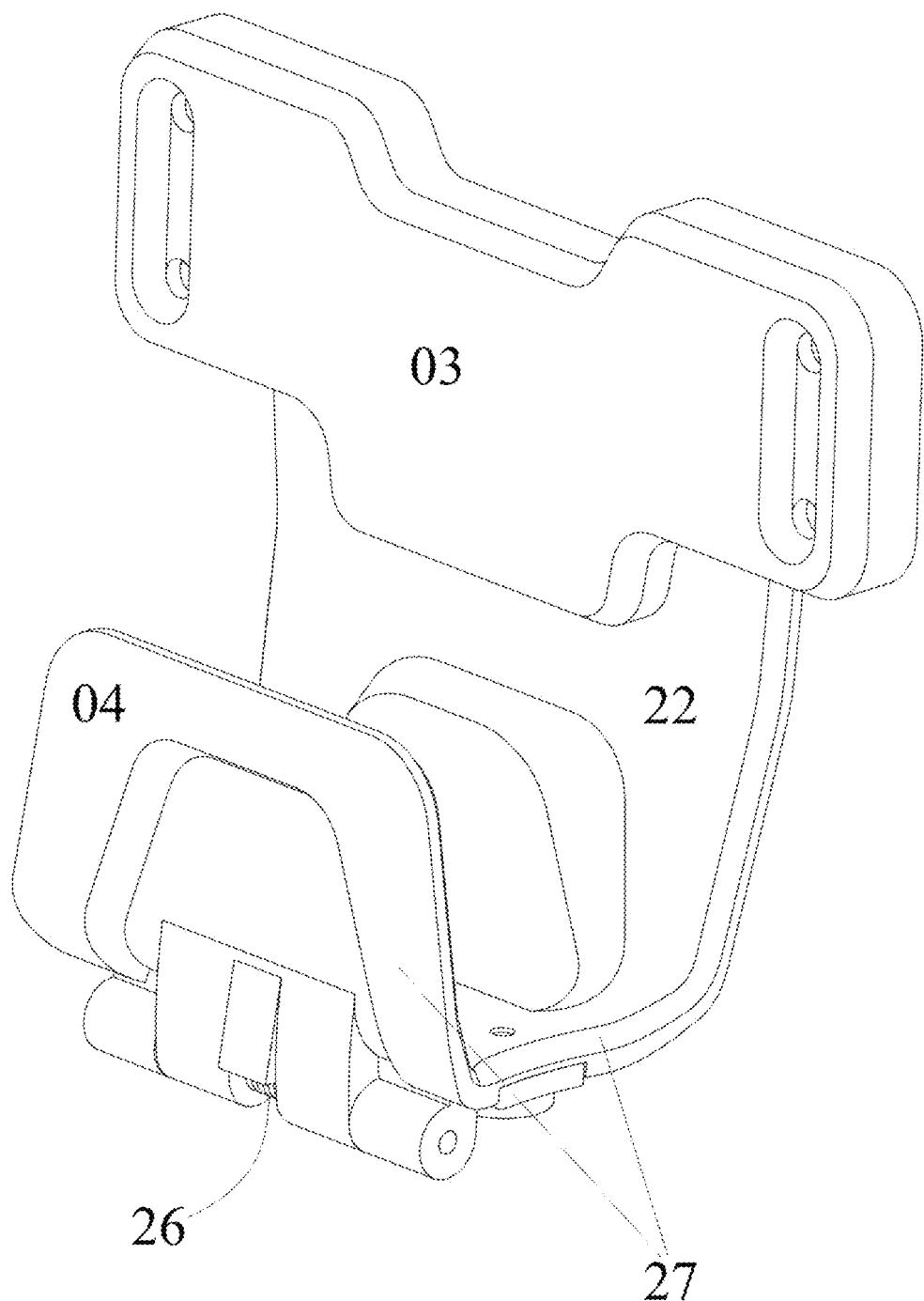
FIG. 9 shows the clip structure of FIG. 8 in a closed configuration in accordance with an exemplary embodiment of the present invention.
Figure 10:
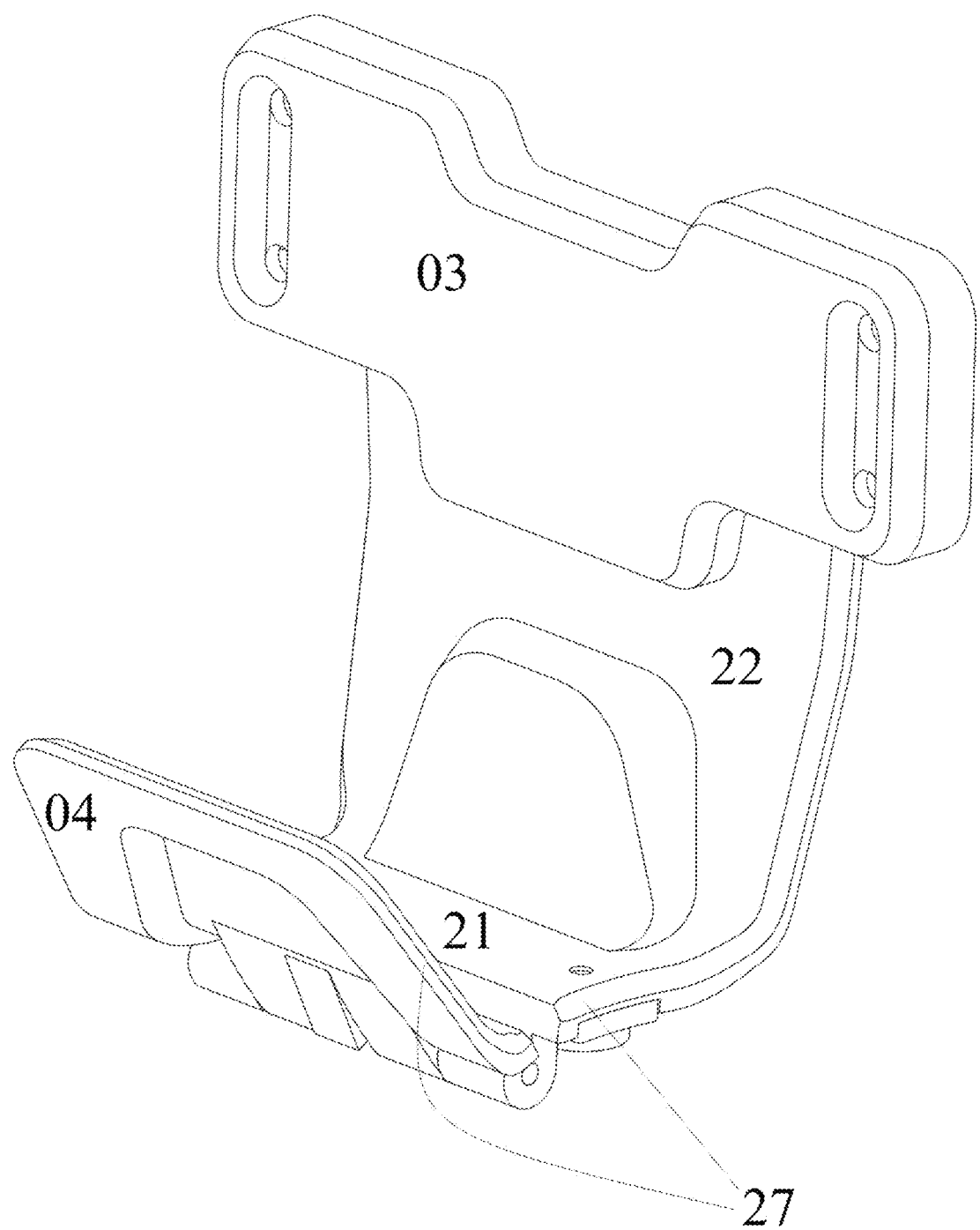
FIG. 10 shows the clip structure of FIG. 8 in an open configuration in accordance with an exemplary embodiment of the present invention.

In some embodiments, connector 22 and side mounting plate 03 may be manufactured as an integral piece or they may be connected directly to each other, as illustrated in FIGS. 8-10. In other embodiments, connector 22 is rotatable around a rotation axis through the side mounting plate 03 using for example a shaft-hole structure 28, as illustrated in FIGS. 6-7. For example, a shaft in the side mounting plate 03 remains fixed while a hole on an arm 29 connecting said connector 22 rotates around the shaft. Alternatively, a hole of the side mounting plate 03 remains fixed while a shaft on the arm 29 connecting the connector 22 rotates within the hole. In such a structure, connector 22 and mounting plate 03 are connected indirectly to each other through arm(s) 29.

In various embodiments, side mounting plate 03 is flat and is configured for attaching to a surface such as walls, under desks, or inside vehicles, using for example nails or screws 13 as shown in FIGS. 1-2, adhesive tape, hook-and-loop belt such as Velcro, or any combination thereof. The side mounting plate 03 may have pre-drilled holes for screws or nails, allowing for secure attachment to various surfaces. Alternatively or additionally, the side mounting plate 03 may have an adhesive area (not shown), which can be used (not shown) for attaching to various surfaces. In certain embodiments, magnet mount 01 includes an optional pedestal 30 placed between the side mounting plate 03 and the surface to increase the distance D between the firearm 02 and the surface. The pedestal 30 and the side mounting plate 03 may be separated pieces that are coupled together, or they may be integrated as a single piece that functions as a thickened side mounting plate 03.

Figure 11:
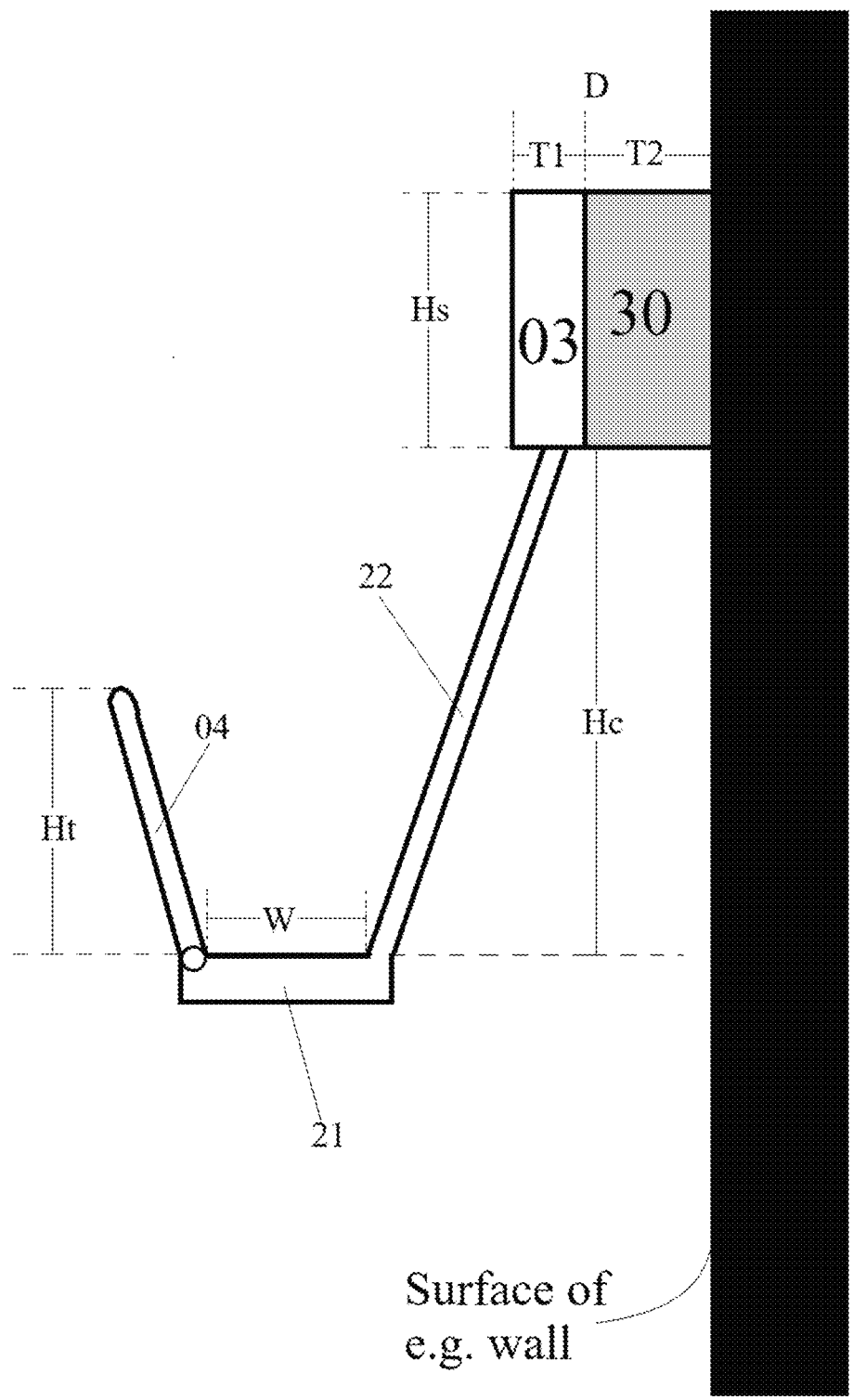
FIG. 11 depicts dimensions of the magnet mount in accordance with an exemplary embodiment of the present invention.

As illustrated in FIG. 11, the side mounting plate 03 may have a thickness T1, the optional pedestal 30 between the side mounting plate 03 and the wall surface may have a thickness T2. The distance D between the firearm 02 and the wall surface is therefore T1 or T1+T2. The firearm seat 21 may have a width W. The vertical height of connector 22 is defined as Hc. The vertical height of side mounting plate 03 is defined as Hs. The vertical height of trigger shield 04 is defined as Ht. In a specific embodiment, T1 is about 1 cm, T2 is about 2 cm, D=T1+T2, W is about 3 cm, Ht is about 4 cm, Hs is about 3.5 cm, Hc is about 5.5 cm. The term "about" is defined as ±20%, ±15%, ±10%, ±8%, ±5%, or ±3%.

In various embodiments, the ratio of T2:T1 is from 1:1 to 8:1 such as 1:1 to 3:1, preferably from 1.5:1 to 2.5:1, and more preferably about 2:1. The ratio of W:T1 is from 2:1 to 6:1, preferably from 3:1 to 5:1, and more preferably about 4:1. The ratio of Hs:T1 is from 2:1 to 5:1, preferably from 3:1 to 4:1, and more preferably about 3.5:1. The ratio of Hc:T1 is from 4:1 to 7:1, preferably from 5:1 to 6:1, and more preferably about 5.5:1. The ratio of Ht:T1 is from 2:1 to 6:1, preferably from 3:1 to 5:1, and more preferably about 4:1.

Figure 12:
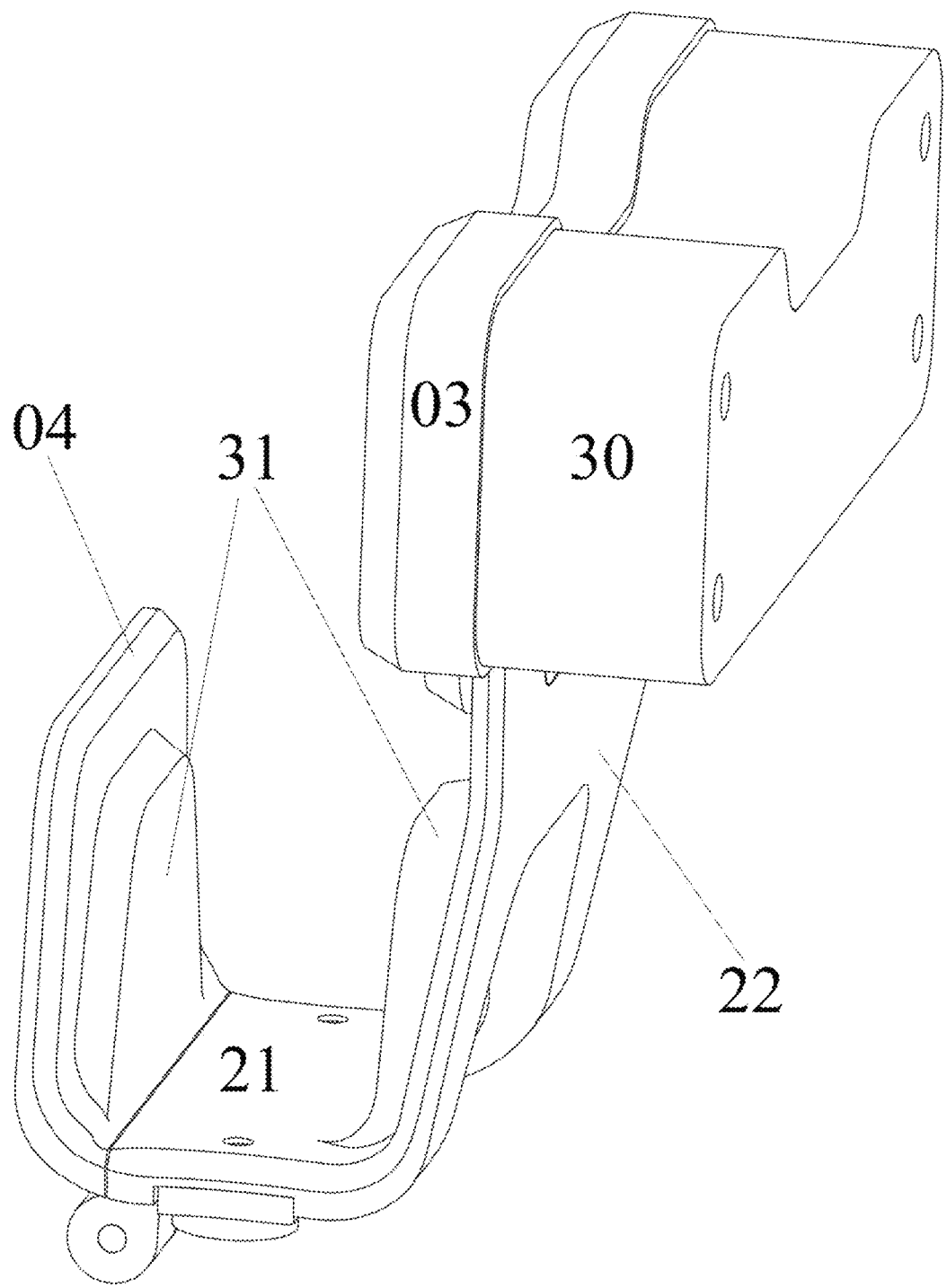
FIG. 12 demonstrates protrusions on the connector and the trigger shield in accordance with an exemplary embodiment of the present invention.

The magnet mount 01 may be configured for mounting a firearm 02 selected from long-barreled guns (not shown) such as carbine, rifle, shotgun, submachine gun, submachine gun, and machine gun; and handguns such as semi-automatic pistol as illustrated in FIGS. 1-3, revolver, derringer, and machine pistol. In some embodiments, the trigger shield 04 and the connector 22 are substantially flat, so that the magnet mount 01 conforms to a handgun selected from a semi-automatic pistol, a derringer, and a machine pistol. One of, or both, the connector 22 and the trigger shield 04 may have a protrusion 31 configured for filling a portion of the space 07 encircled by the trigger guard 08 and the frame 09 of the firearm 02, as illustrated in FIG. 12.

In some other embodiments, the connector 22 and the trigger shield 04 are curved with a curved portion conforms to the cylinder of a revolver (not shown).

Referring to FIG. 4 again, the magnets 05 may be made of ferromagnetic metal such as iron, cobalt, and nickel; or alloy of rare earth elements such as neodymium magnets made from an alloy of neodymium, iron, and boron; and samarium-cobalt magnets; and preferably said one or more magnets are strong and permanent neodymium magnets.

The magnets 05 may be encased and secured within the side mount plate 03 as shown in FIG. 4. Alternatively or additionally, the magnets 05 may be bonded to the side mounting plate 03. Magnets 05 may be coated with a rubber or polymer material for preventing the firearm 02 from getting scratched or damaged when the firearm 02 contacts those magnets.

The side mounting plate 03 and/or the pedestal 30 may be made from a material such as steel, aluminum, rubber, plastic, and polymer. Preferably, the side mounting plate 03 has grooves or ridges (not shown) to stabilize the firearm 02 and prevent it from sliding off. Side mounting plate 03 and/or the pedestal 30 may have a shape of rectangular or square, and optionally have rounded corners to prevent sharp edges that could cause injury or damage In various embodiments, the side mounting plate 03 and/or the pedestal 30 are configured for attaching to various surfaces such as walls, under desks, or inside vehicles, using for example screws or nails, adhesive tape, hook-and-loop belt such as Velcro, or any combination thereof. The side mounting plate 03 and/or the pedestal 30 may have pre-drilled holes for screws or nails, allowing for secure attachment to various surfaces. Alternatively or additionally, the top mounting plate 03 and/or the pedestal 30 may have an adhesive area (not shown), which can be used (not shown) for attaching to various surfaces.

As described above, some embodiments of the invention provide a method of securely holding a firearm 02. As illustrated in FIG. 5, step (i) of the method is providing a magnet mount 01 comprising a side mounting plate 03, one or more magnets 05 affixed to the side mounting plate 03, and a firearm holder 20 including (a) a firearm seat 21, (b) a connector 22 extending upwardly from the firearm seat 21 along one side (left/right side) of the firearm 02 and connecting to the side mounting plate 03, and (c) a trigger shield 04 extending upwardly from the firearm seat 21 along another side (right/left side) of the firearm 02. Step (ii) of the method is placing the firearm 02 on firearm seat 21 and next to said one side (left/right side) of the magnet mount 01 (which does not block a line connecting the front sight and the rear sight of the firearm 02). Firearm 02 and the side mounting plate 03 are in a side-by-side arrangement. Magnets 05 provide a holding power to support at least a portion of the weight of the firearm 02. Step (iii) of the method is blocking at least 50% of a trigger accessing area 07 of the firearm 02 with the trigger shield 04, to prevent a finger from accessing to and touching the trigger 10 from said another side of the firearm 02 and causing accidental discharge.

The method of the invention may further include a step of adjusting the length of the adjustable spacer 23 so as to push the firearm grip 25 away from the trigger shield 04 and/or the connector 22 until magazine release 24 is prevented from being touched or contacted by the trigger shield 04 and/or the connector 22 and causing an inadvertent release of the magazine (not shown) of firearm 02.

Figure 13:
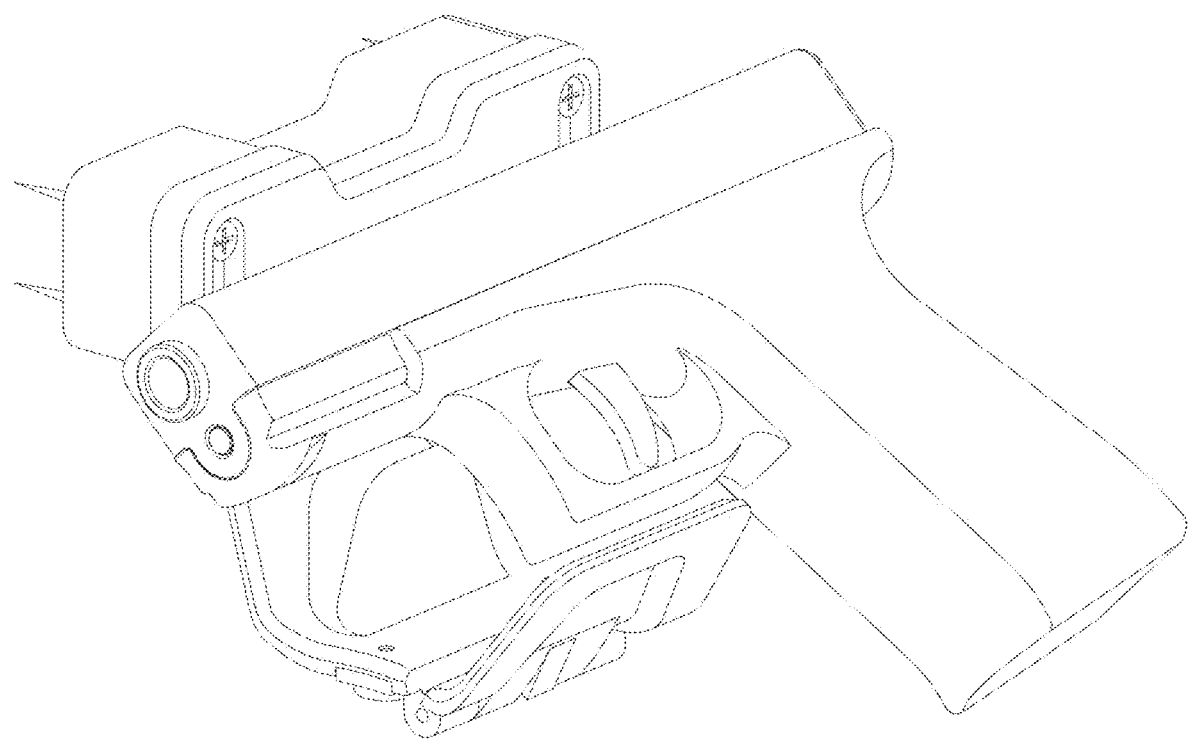
FIG. 13 illustrates a step of rotating the firearm around the side mounting plate 03 and opening the clip while move the firearm away from the firearm seat in accordance with an exemplary embodiment of the present invention.
Figure 14:
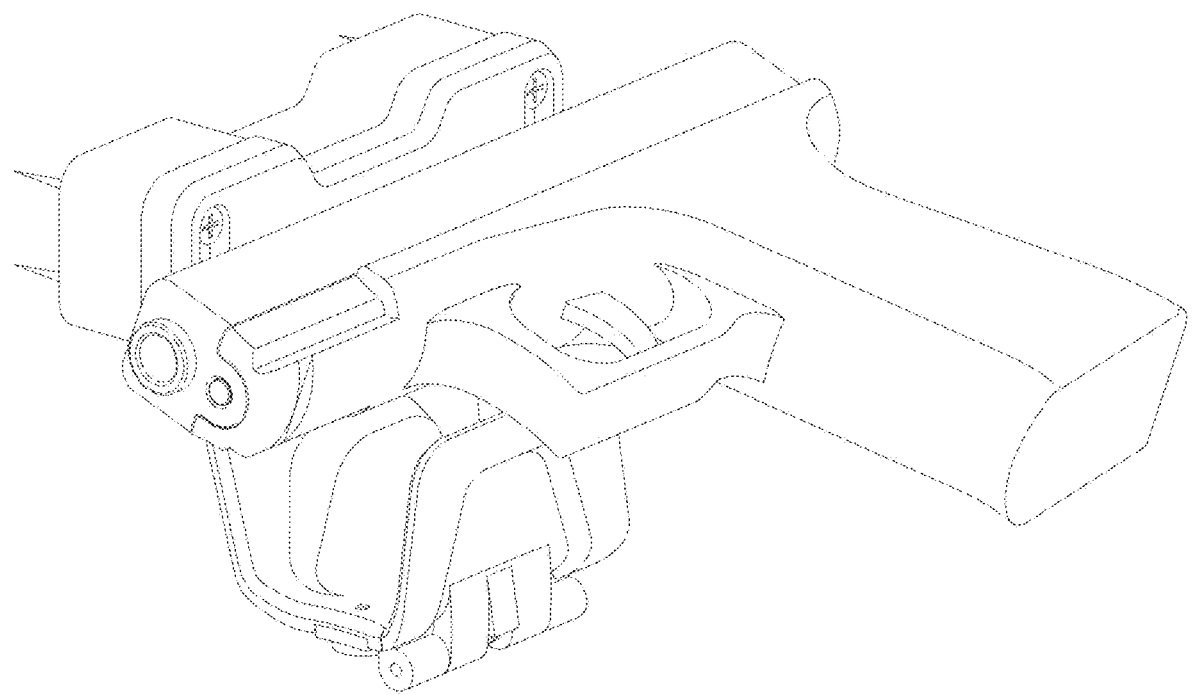
FIG. 14 illustrates a step of further rotating the firearm around the side mounting plate 03 to disengage or separate the firearm from the magnet mount in accordance with an exemplary embodiment of the present invention.

The method of the invention may further include another step of rotating the firearm 02 around side mounting plate 03 and opening clip 27 (such as a spring clip 27) by hand force while move the firearm 02 away from the firearm seat 21 (and connector 22 too), before completely disengaging/separating the firearm 02 from the magnet mount 01, as illustrated in FIGS. 13-14.

Figure 15:
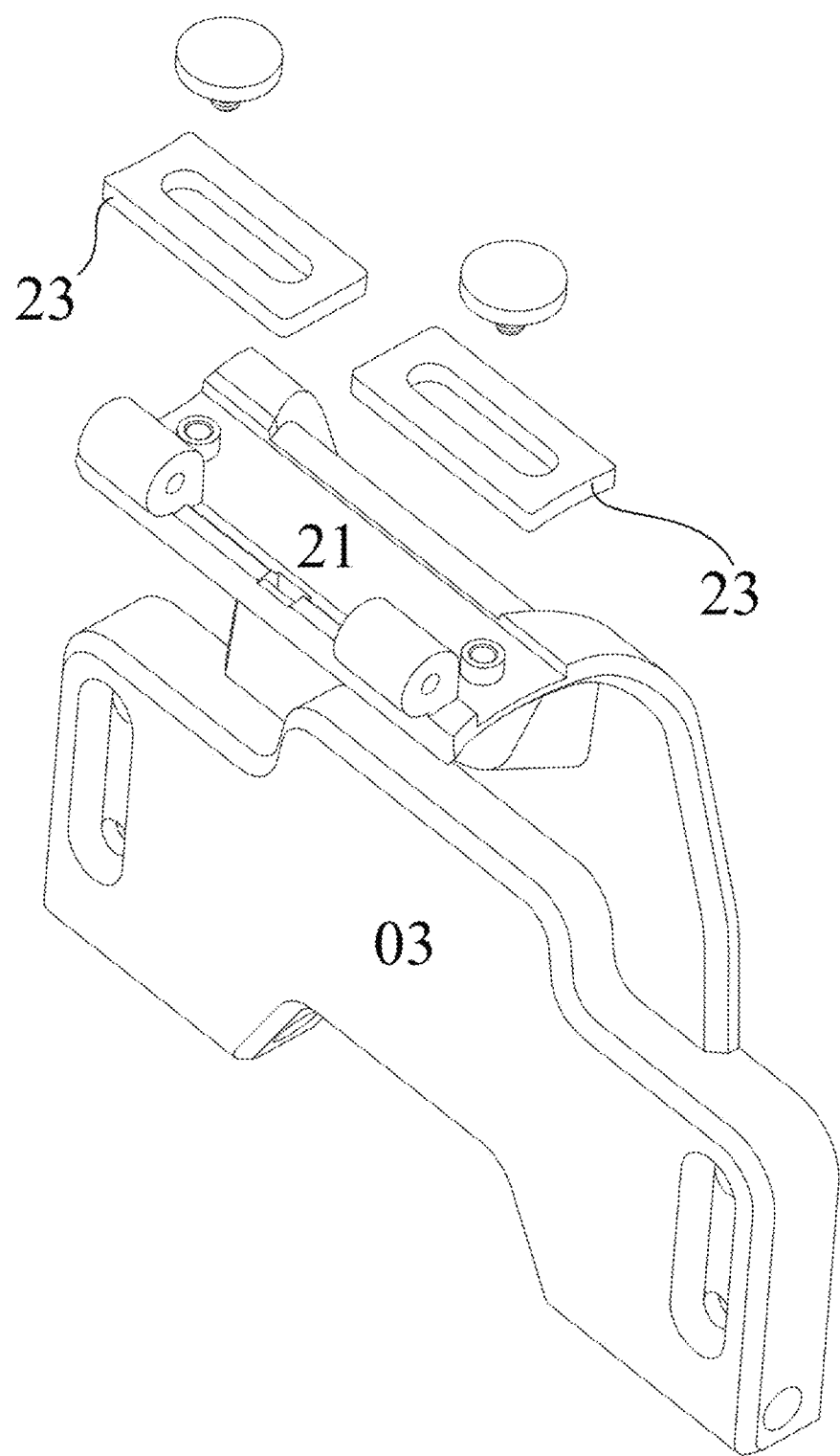
FIG. 15 shows an adjustable spacer mounted on the firearm seat in accordance with an exemplary embodiment of the present invention.
Figure 16:
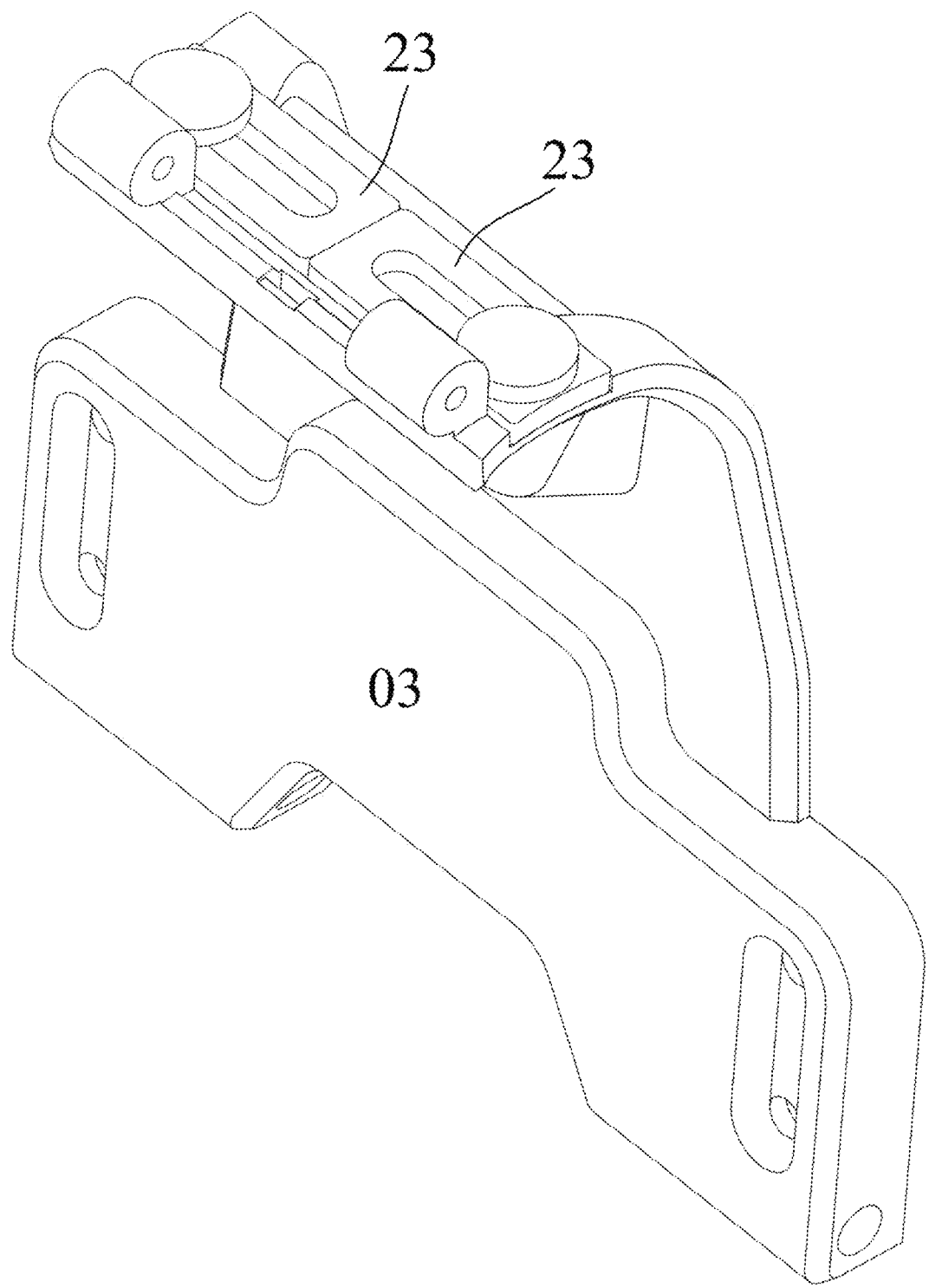
FIG. 16 schematically illustrates a smaller adjustable spacer that protrudes out from the firearm seat in accordance with an exemplary embodiment of the present invention.
Figure 17:
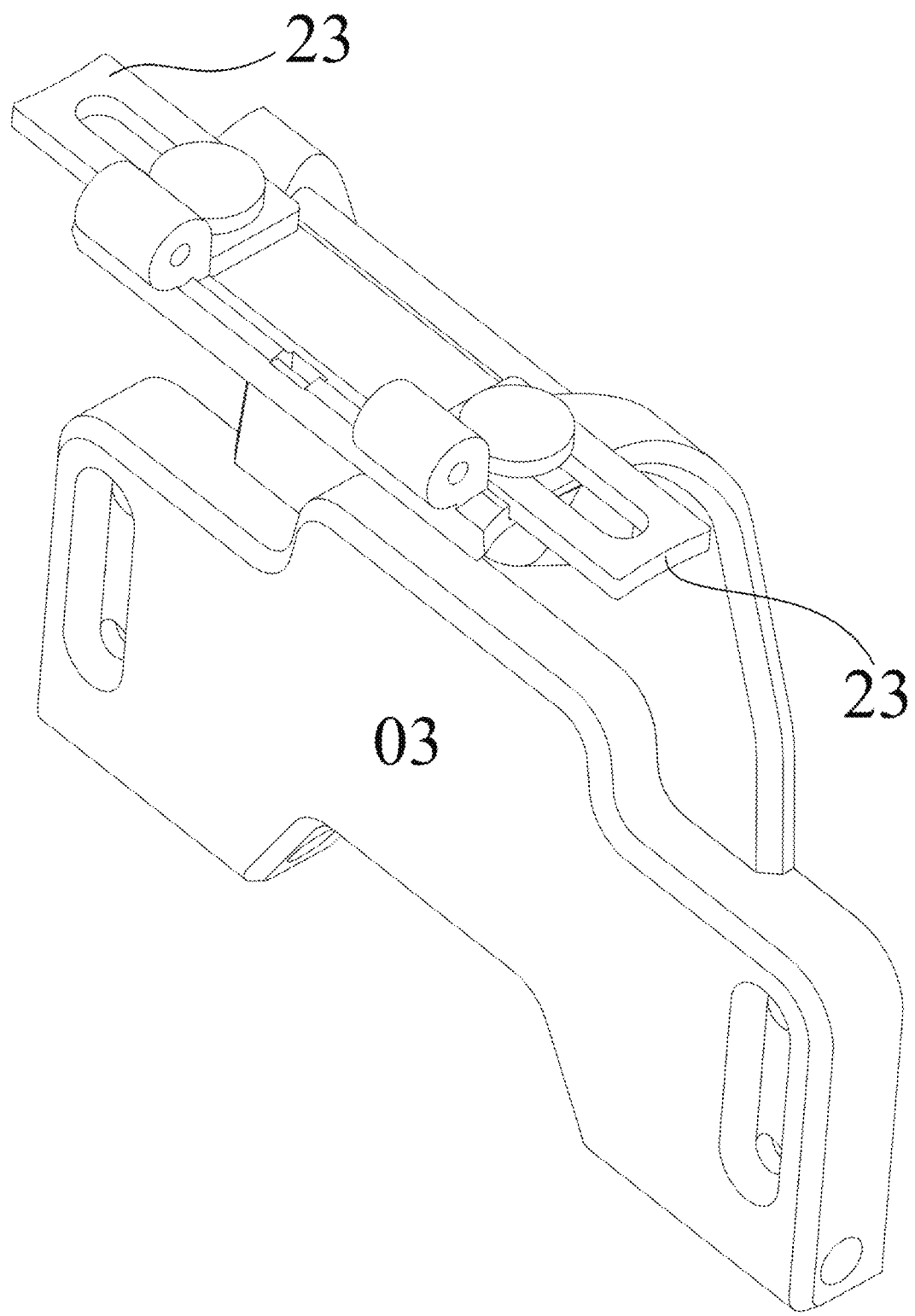
FIG. 17 shows a larger adjustable spacer that protrudes out from the firearm seat in accordance with an exemplary embodiment of the present invention.

Referring to FIGS. 1-3 again, the magnet mount 01 may include an adjustable spacer 23 mounted on the firearm seat 21. Adjustable spacer 23 is designed to protrude out from an edge of the firearm seat 21 and against the firearm grip 25. The size/length of the adjustable spacer 23 is sufficient to protect magazine release 24 from being touched or contacted by the trigger shield 04 and/or the connector 22 causing an inadvertent release of the magazine (not shown) of firearm 02. FIGS. 15-17 illustrate a specific, but still exemplary design, of two adjustable spacers 23 protruding out from two edges of firearm seat 21. An elongated slot in the adjustable spacer 23 may allow a screw to pass through a certain position on the slot, so the screw can attach the spacer 23 into the firearm seat 21 (e.g. the bottom side thereof). The size/length of the adjustable spacer 23 that protrudes out from an edge of the firearm seat 21 may be adjusted by the position on the elongated slot through which the screw pass for attaching the spacer 23 into the firearm seat 21, as shown in FIG. 17.

In the foregoing specification, embodiments of the present invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicant to be the scope of the invention, is the literal and equivalent scope of the set of claims that issue from this application, in the specific form in which such claims issue, including any subsequent correction.

The invention claimed is:

1. A magnet mount for securely holding a firearm, comprising:
   (i) a side mounting plate configured for placing next to one side of the firearm;
   (ii) one or more magnets affixed to the side mounting plate, wherein said one or more magnets are configured for providing a holding power to support at least a portion of the weight of the firearm,
   (iii) a firearm holder including (a) a firearm seat for the firearm to be placed thereon, (b) a connector extending upwardly from the firearm seat along said one side of the firearm and connecting to the side mounting plate, and (c) a trigger shield extending upwardly from the firearm seat along another side of the firearm,
   wherein the trigger shield is configured for blocking at least 50% of a trigger accessing area of the firearm, to prevent a finger from accessing to and the trigger from said another side of the firearm and causing accidental discharge,
   wherein said trigger accessing area is defined as the area that is encircled by the trigger guard and the frame of the firearm, and
   wherein the magnet mount further comprises an adjustable spacer mounted on the firearm seat, wherein the adjustable spacer protrudes out from an edge of the firearm seat and against a firearm grip and has a size sufficient to protect the firearm's magazine release from being touched or contacted by the trigger shield and/or said connector causing an inadvertent release of the magazine.

2. The magnet mount according to claim 1, wherein said connector is configured for blocking at least 50% of a trigger accessing area of the firearm on said one side of the firearm, to prevent a finger from accessing to and touching the trigger from said one side of the firearm and causing accidental discharge.

3. The magnet mount according to claim 1, wherein said connector and the side mounting plate are manufactured as an integral piece or connected directly to each other; or wherein said connector is rotatable around a rotation axis through the side mounting plate using a shaft-hole structure.

4. The magnet mount according to claim 1, wherein the trigger shield and the firearm seat are manufactured as an integral piece that applies a squeezing force to the firearm they are holding to stabilize the firearm and prevent it from sliding off; or wherein the trigger shield, the firearm seat, and an elastic member including a spring are built as a clip including a spring clip that applies a constant force to the firearm they are holding to stabilize the firearm and prevent it from sliding off.

5. The magnet mount according to claim 1, wherein the side mounting plate is flat and is configured for attaching to a surface including walls, under desks, or inside vehicles, using screws, adhesive tape, hook-and-loop belt including Velcro, or any combination thereof.

6. The magnet mount according to claim 5, further comprising a pedestal placed between the side mounting plate and the surface to increase the distance D between the firearm and the surface.

7. The magnet mount according to claim 6, wherein the side mounting plate has a thickness T1, the pedestal has a thickness T2, the firearm seat has a width W, the vertical height of the connector is Hc, the vertical height of the side mounting plate is Hs, and the vertical height of the trigger shield is Ht; and
wherein the ratio of T2:T1 is from 1:1 to 8:1, the ratio of W:T1 is from 2:1 to 6:1, the ratio of Hs:T1 is from 2:1 to 5:1, the ratio of Hc:T1 is from 4:1 to 7:1, the ratio of Ht:T1 is from 2:1 to 6:1.

8. The magnet mount according to claim 1, which is configured for mounting a firearm selected from long-barreled guns including carbine, rifle, shotgun, submachine gun, submachine gun, and machine gun; and handguns including semi-automatic pistol, revolver, derringer, and machine pistol.

9. The magnet mount according to claim 1, wherein the connector and the trigger shield are substantially flat; and the magnet mount is configured for mounting a handgun selected from a semi-automatic pistol, a derringer, and a machine pistol; or
wherein the connector and the trigger shield are curved; and the curved portion conforms to the cylinder of a revolver.

10. The magnet mount according to claim 1, wherein said one or more magnets are made of ferromagnetic metal including iron, cobalt, and nickel; or alloy of rare earth elements including neodymium magnets made from an alloy of neodymium, iron, and boron; and samarium-cobalt magnets; and preferably said one or more magnets are strong and permanent neodymium magnets.

11. The magnet mount according to claim 1, wherein said one or more magnets are encased and secured within the side mount plate.

12. The magnet mount according to claim 1, wherein said one or more magnets are bonded to the side mounting plate; and said one or more magnets are coated with a rubber or polymer material for preventing the firearm from getting scratched or damaged when the firearm contacts said one or more magnets.

13. The magnet mount according to claim 1, wherein the side mounting plate is made from a material including steel, aluminum, rubber, plastic, and polymer.

14. The magnet mount according to claim 1, wherein the side mounting plate has grooves or ridges to stabilize the firearm and prevent it from sliding off.

15. The magnet mount according to claim 1, wherein the side mounting plate has a shape of rectangular or square.

16. The magnet mount according to claim 1, wherein the side mounting plate has pre-drilled holes for screws, allowing for secure attachment to various surfaces; or wherein the side mounting plate has an adhesive area, which can be used for attaching to various surfaces.

17. A method of securely holding a firearm, comprising:
(i) providing a magnet mount comprising a side mounting plate, one or more magnets affixed to the side mounting plate, and a firearm holder including (a) a firearm seat, (b) a connector extending upwardly from the firearm seat along one side of the firearm and connecting to the side mounting plate, (c) a trigger shield extending upwardly from the firearm seat along another side of the firearm, and (d) an adjustable spacer mounted on the firearm seat, wherein the adjustable spacer protrudes out from an edge of the firearm seat and against a firearm grip
(ii) placing the firearm on the firearm seat and next to said one side of the magnet mount, wherein said one or more magnets provide a holding power to support at least a portion of the weight of the firearm;
(iii) blocking at least 50% of a trigger accessing area of the firearm with the trigger shield, to prevent a finger from accessing to and touching the trigger from said another side of the firearm and causing accidental discharge, wherein said trigger accessing area is defined as the area that is encircled by the trigger guard and the frame of the firearm; and
(iv) adjusting the length of the adjustable spacer so as to push the firearm grip away from the trigger shield and/or the connector until a magazine release is prevented from being touched or contacted by the trigger shield and/or the connector and causing an inadvertent release of the magazine of the firearm.

* * * * *